UNITED STATES PATENT OFFICE.

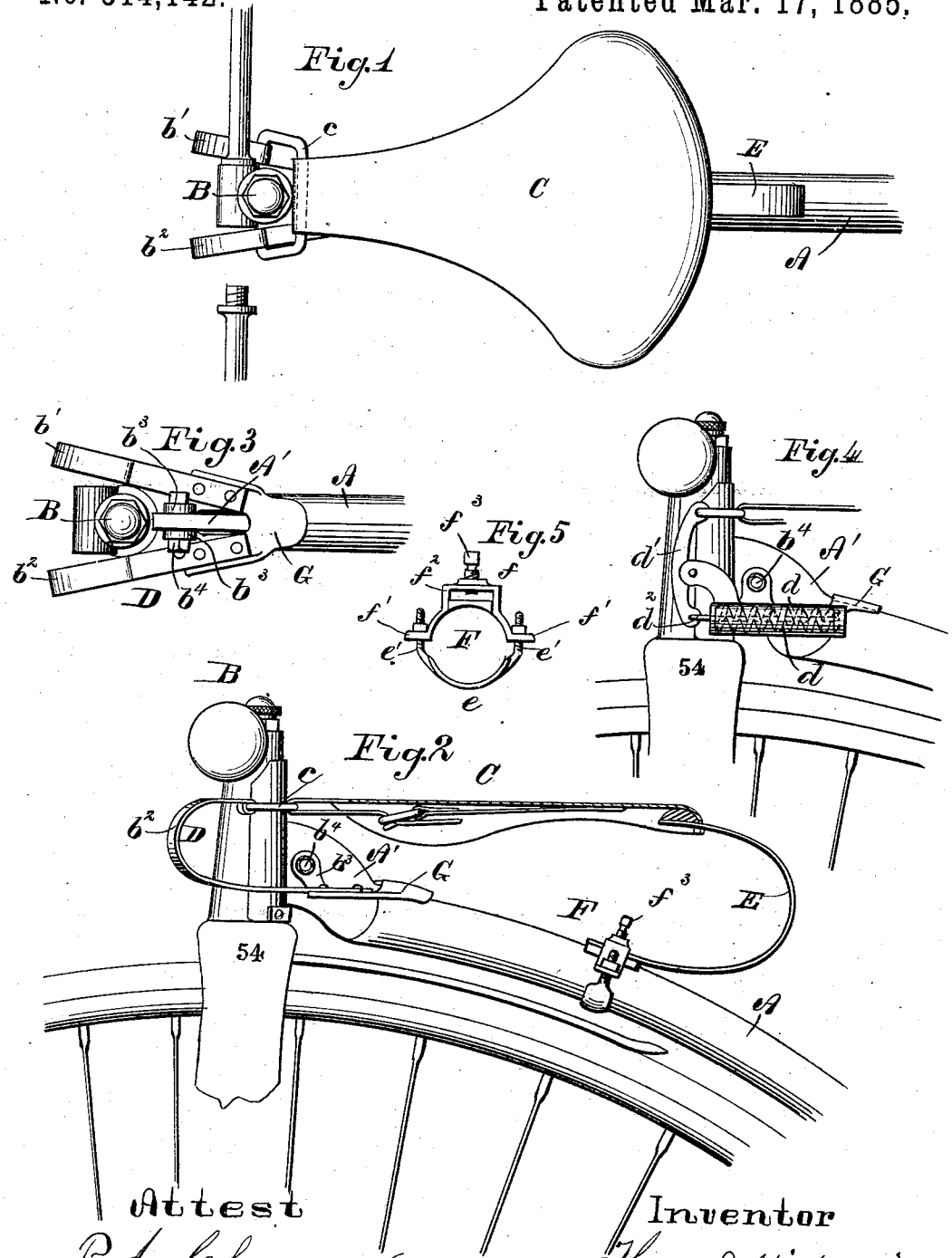

THOMAS J. KIRKPATRICK, OF SPRINGFIELD, OHIO.

BICYCLE-SADDLE.

SPECIFICATION forming part of Letters Patent No. 314,142, dated March 17, 1885.

Application filed November 7, 1884. (No model.)

*To all whom it may concern:*

Be it known that I, THOMAS J. KIRKPATRICK, a citizen of the United States, residing at Springfield, in the county of Clark and State of Ohio, have invented a certain new and useful Improvement in Bicycle-Saddles, of which the following is a specification.

My invention relates to that class of bicycle-saddles in which a flexible seat is suspended directly from a saddle spring or springs without the use of an intermediate saddle frame or tree; and my invention consists in a peculiar arrangement of front and rear springs secured independently to the reach or "backbone" of the machine in connection with the flexile seat suspended at the front and rear from said springs.

My invention further consists in the combinations and arrangements of parts hereinafter described and claimed.

In the accompanying drawings, which form a part of this specification, Figure 1 is a plan view of my saddle in place on a bicycle, one of the handles of the "machine" being removed to better show the forward spring. Fig. 2 is a side elevation of the same, with the flexile seat shown partly in section. Fig. 3 is a plan view of a part of the front of the machine, showing the front spring thereon, the flexile seat being removed. Fig. 4 is a side elevation showing a modification of the front spring, and Fig. 5 is an end elevation of the clip for holding the rear spring.

Like parts are indicated by similar letters of reference throughout the several views.

In the said drawings, A represents the reach or backbone of an ordinary bicycle, and B the "head" of the same, into which the said backbone is pivoted in the ordinary manner.

C is the flexile seat, which is supported at the front and rear, respectively, by the springs D and E. These springs D and E are secured independently to the perch or backbone A, each spring being preferably secured as nearly as practicable under the end of the saddle to which said spring is attached. By this arrangement the space under the saddle is left entirely free, there being no intervening mechanism or device between the saddle and the perch. This, in connection with the springs at both ends, is a very desirable feature, since the saddle is thus capable of a long vertical vibration without anything to interfere with or chafe the legs of the rider. The rear spring, E, I preferably make of flat steel, one end of said spring being riveted or otherwise secured to a cross-piece, $a$, to which the rear portion of the flexile seat is secured. The spring E is bent down, so that the lower end comes under the saddle, and is secured to the backbone A by a suitable clip, F.

In order to extend the suspended flexile seat as far forward as possible, and at the same time secure the full elasticity of the forward spring, D, I construct the said spring with two wings, $b'$ $b^2$, adapted to extend forward of the head B and turn upward and backward to connect with the forward end of the seat C. The seat C is preferably attached to the wings $b'$ $b^2$ of spring D by a loop, $c$, adapted to extend around the head B, the ends of said loop being journaled, respectively, in the ends of the wings $b'$ $b^2$. The wings $b'$ $b^2$ are preferably made separate, and riveted or otherwise secured at their lower ends to a metallic clip, G, said clip being bifurcated and provided on either side with small ears $b^3$, adapted to extend up on either side of the flat portion A' of the backbone, commonly called the "neck." The clip G is secured to the backbone by a single bolt, $b^4$, which passes through the neck A' and through the ears $b^3$. The bolt commonly used for holding the front end of the ordinary saddle-spring may be used for this purpose. The rear end of the clip G rests on the top of the backbone A. The top of the spring D, to which the seat is attached, being considerably above the bolt $b^4$, said bolt acts as a fulcrum, which brings the strain on the rear end of the clip G in a downward direction and directly on the backbone A.

In Fig. 4 I have shown a modification of the front spring, D. The clip G is provided on either side with pockets $d$, in which are inclosed small coiled springs. The forward end of each pocket supports a fulcrum, in which is pivoted a small lever, $d'$. The loop $c$ is attached to the upper ends of the respective levers $d'$, the lower ends of said levers being connected by suitable connecting-rods, $d^2$, to the coiled springs in the pockets. The connecting-rods $d^2$ are preferably made sufficiently long to extend entirely through the springs and connect to the far end of said springs, so that the resilience of the springs is obtained by compression. The clip F, which holds the lower end of the rear spring, E, is made in two pieces, e and f. The lower part, e, is provided at each end with screw-threaded studs e', adapted to extend up through lugs f' f' on the upper part, f, of said clip, and to receive nuts by means of which the said clip may be secured at any point around the backbone. The upper part, f, of the clip is provided with a small housing, f², adapted to receive the lower end of the spring E. In the top of the housing f² is a small set-screw, f³, by means of which the spring E may be held against longitudinal movement through the housing, the said spring being thus adapted to be moved backward or forward through the housing or removed and replaced, as desired.

I have shown the forward end of the flexile seat passed through the loop c, and provided with a strap and buckle for taking up the slack or increasing the tension of the seat. If desired, however, the end of the seat may be riveted fast in the loop c, and the tension of the seat regulated by slipping the spring E backward or forward through the clip F.

If desired, the loop c, to which the forward end of the seat is attached, may be entirely dispensed with, the front end of the seat being bifurcated, as set forth in my Patent No. 278,560, dated May 29, 1883, the respective wings or straps of the seat being in that case fastened directly to the wings or sides of the front spring, D.

It is obvious that the above-described saddle may be adapted to tricycles as well as bicycles, and is applicable to machines of the "Star" type as well as the ordinary bicycle.

Having thus described my invention, I claim—

1. The combination, with the perch or backbone of a bicycle or similar vehicle, of independent front and rear springs secured to said perch or backbone and a flexile seat suspended directly from said springs at the front and rear, respectively, substantially as set forth.

2. In a bicycle-saddle, the combination, with a flexile seat, of independent front and rear springs or spring-connections, to which the respective ends of said seat are directly attached, one of said springs or spring-connections being adapted to extend forward of the head of the bicycle, substantially as set forth.

3. The combination, with a flexile seat, of independent front and rear springs for supporting said seat, secured to the perch or backbone of a bicycle, the front spring being constructed with two wings adapted to extend on either side of the head and to connect to the forward end of said seat, and means for adjusting the tension of said seat, substantially as specified.

4. The combination, with a flexile seat, of front and rear springs, from which the ends of the seat are respectively suspended, the forward spring being bifurcated at the front end, and adapted to extend forward of the head and connect to the front end of the seat, the rear end of said spring being adapted to rest on the top of the backbone, and a bolt for securing said spring to the backbone, substantially as set forth.

5. The combination, with a flexile seat suspended at its respective ends from independent front and rear springs, of a clip for securing the rear spring to the backbone or perch, said clip being made in two parts, the lower part being provided with screw-threaded studs adapted to extend up through lugs on the upper part, and to receive nuts for securing said clip in position, and the upper part being provided with a housing and set-screw for receiving and securing the lower end of the said rear spring, substantially as set forth.

6. The combination, with a flexile seat, of independent front and rear springs, from which said seat is suspended, the said front spring being bifurcated at its forward end, and adapted to extend on each side of the head and connect with the forward end of said seat, and adapted at its rear end to rest on the backbone, to which it is secured by a single bolt, the said rear spring being secured to the backbone by a clip provided with a housing and set-screw adapted to receive and hold the lower end of said spring, substantially as described and shown.

In testimony whereof I have hereunto set my hand this 4th day of November, A. D. 1884.

THOMAS J. KIRKPATRICK.

Witnesses:
PAUL A. STALEY,
CHASE STEWART.